Patented May 16, 1933

1,909,008

UNITED STATES PATENT OFFICE

CHARLES H. PRANGE, OF LYNDHURST, NEW JERSEY, ASSIGNOR TO AUSTENAL LABORATORIES, INC., OF NEW YORK, N. Y., A CORPORATION OF NEW YORK

HIGHLY REFRACTORY DENTAL MOLD MATERIAL AND METHOD OF MAKING THE SAME

No Drawing. Application filed October 21, 1932. Serial No. 638,920.

My present invention relates generally to the art of dental mechanics, and has particular reference to an improved refractory mold material or paste, and simultaneously to a new and improved method of making and using such material.

Although the primary use of my present improved material lies in the production of dental molds in which dentures and similar appliances and dental elements are adapted to be cast, it is to be understood that the term "mold", as the same is used herein, is intended to carry a broader significance and to include any type of model, mold, form, or the like of the character generally employed in this art.

The commonest type of mold material at present utilized in the manufacture of dentures and the like consists essentially of plaster (calcium sulphate) and silica. In casting or forming dentures or similar elements of many of the modern materials of high fusibility, however, the ordinary plaster-silica composition fails to be satisfactory, because it is not sufficiently refractory. The plaster, which is the binding ingredient, decomposes under the extreme heat which is necessary to fuse materials such as austenitic alloys.

The silica ingredient of the ordinary composition is highly desirable, however, for dental work, because of its high coefficient of thermal expansion. Dental molds are always made to order, as it were, and cannot be made arbitrarily large to provide for shrinkage of castings. Silica permits the molds to be accurately contoured to a desired unique configuration of a pattern or model, and the characteristics of the silica permit the mold to be satisfactorily expanded, under heat, just prior to the casting operation, to compensate for whatever shrinkage may take place.

Where I have attempted to employ various refractory cements, to serve as binders for silica, I have found that most of them are unsatisfactory for the reason that extreme heat induces a sort of fluxing action. Certain cements are quite satisfactory under normal conditions, but become utterly useless and tend to melt or flux under the slightest overheating.

Sodium silicate, or waterglass, is fairly satisfactory as a binder, but its extreme basic characteristic causes it to react unfavorably with silica, which is acid, and even with neutral refractories, such as alumina. Moreover, it is a difficult material to work with, because it forms a hard glassy skin in drying, and because its rapidity of setting cannot always be accurately controlled. Furthermore, the final composition, when set, invariably includes a sodium salt, which is an extraneous ingredient.

In many instances, high fusing materials have heretofore been cast in molds composed of ordinary plaster-silica composition, wherein the faces of the mold have been previously coated with pure alumina or the like. This has involved special procedures and steps, however; and, so far as I am aware, has not adequately solved all of the problems arising from the use of high fusing materials.

A general object of my present invention is to provide a mold material of high refractoriness, of good thermal expansibility, and at the same time capable of use in accordance with ordinary and established procedures. My present material is, for example, capable of production in pasty form, and capable of being poured and treated in substantially the same way as ordinary plaster has heretofore been used. In fact, it may be said that my present invention provides an improved plastic material similar in workability and characteristics to ordinary plaster, yet sufficiently refractory to withstand extremely high temperatures.

By means of my invention I am enabled to produce a dental mold consisting entirely of pure silica; and when it is borne in mind that silica by itself is not liquid or plastic, nor capable of being poured into varying shapes, the importance of this result, capable of achievement by my present invention, will be more fully appreciated.

I accomplish the foregoing objective by employing a highly refractory material such as silica admixed with a binder composed entirely of pure silica gel. Silica gel, as is well known, is a colorless and transparent substance which exists in varying degrees of firmness. When it embodies a large amount of water, it is soft and pasty like gelatine; and when it is dehydrated it becomes extremely hard, glassy, and brittle.

Silica gel is available on the market in its hard and glassy condition, but so far as I am aware there is no practical way of utilizing it in this condition to serve as a binding medium for a material such as ordinary silica. My invention, therefore, involves a procedure whereby pure silica gel may be caused to be generated, in situ, in a plastic mixture whose main ingredient is ordinary silica, alumina, or the like.

In achieving the desirable results hereinbefore illustratively specified, I resort to the characteristic of colloidal silicic acid to undergo a spontaneous sort of transformation whereby silica gel is generated or formed in a continuously increasing manner. The exact chemical transformation which silicic acid undergoes is not fully understood, but there is apparently a spontaneous and increasing aggregation of colloidal silica particles, resulting ultimately in a complete conversion of the silicic acid into what is commonly known as silica gel.

The binder which I employ in accordance with my present invention is a substance which is adapted in the foregoing general manner to form or generate pure silica gel. More specifically, I have found that certain organic silicates, preferably silicon esters, when hydrolyzed and slightly acidified are admirably characterized by the ability to undergo a spontaneous transformation with the ultimate generation of nothing more than pure silica gel.

For example, in the preferred method of carrying out my invention, a silicon ester of the general class which includes, e. g., tetraethyl silicate, tetra-butyl silicate, methyl silicate, glyceryl silicate, or di-glycol silicate, is conditioned or treated, by the addition of a slight amount of an acidifying agent and by the addition of water, if necessary, to produce a liquid or semi-liquid substance which is satisfactorily usable, as a binder, to form a paste or plastic mixture with a material such as silica, alumina, or the like. Such mixture is adapted to be poured, handled, or manipulated in substantially the same manner as ordinary plaster, and is characterized by an ability to set or harden, just like plaster. This action is probably due to a formation of colloidal silica acid and to a subsequent spontaneously increasing transformation of the silicic acid into silica gel, the latter ultimately becoming more and more dehydrated until it is entirely solid.

The setting of the present material may be accelerated in a variety of ways, as, for example, by heat; but in practicing my invention I prefer to incorporate with the plastic mixture a slight amount of a suitable accelerating agent, whereby the setting is sufficiently complete to permit handling within about half an hour. Magnesium oxide powder is preferably used for the accelerating purpose.

The general nature of my present invention, and the essential features thereof, as well as the numerous advantages achieved thereby, will be more fully appreciated by more specifically setting forth an illustrative example. It is to be understood, however, that the procedural steps and the proportions of parts, and similar details, as hereinafter set forth, are given merely by way of illustration and are obviously capable of wide variations to suit differing requirements.

One method of carrying out my present invention, which has proven to be satisfactory, consists in first producing a binder by properly treating and conditioning liquid tetraethyl silicate. With about eight volumes of this organic silicate I mix about one volume of water, and a trace of a suitable acidifying agent, e. g., a few drops of hydrochloric or sulphuric acid, thereby inducing a partial hydrolysis. Since these liquids will not readily mix, it is preferable to add a small amount of a material which is miscible with all. For example, I prefer to add one to two volumes of ethyl alcohol or acetone, whereby a true and thorough mixture of the liquids is readily produced. The amount of acid to be used will vary with requirements, but should preferably be just sufficient to make the mixture very slightly acid when tested with litmus paper.

The mixture is then preferably stirred on a water bath until a sample, upon drying upon the hand, for example, is sticky to the touch. Usually, a period of one to two hours will suffice.

This produces the binder heretofore referred to, and having the characteristics hereinbefore mentioned. And this binder may be used immediately or it may be stocked for a reasonable period of time to be used when required.

In making up the plastic or pasty mold material, I mix approximately two parts of dry silica (preferably in the form of ground quartz) with about one part of the liquid binder. The excess binder may be readily eliminated by vibrating the composition to cause the solid parts thereof to settle and to cause the excess liquid to rise to the top. If preferred, a relatively greater proportion of the dry silica may be used, in which case the plastic mold material may be produced by kneading it.

This plastic material will normally set in a period of two or three days, but the speed of initial setting is preferably increased by either of two methods.

One satisfactory procedure lies in heating the mixture in an oven to approximately 110–115° C. This heating apparently speeds the transformation of the colloidal silicic acid into colloidal silica particles, and an initial set can be secured in approximately an hour or less.

The method which I prefer to use to speed the initial setting of the mixture is to incorporate with the pasty material a trace of a suitable accelerating agent. While I have found that a trace of almost any alkaline material will do, I have found magnesium oxide powder to be extremely satisfactory. I prefer to use it by mixing it directly with the dry silica before the pasty material is produced; and in carrying out this procedure I use about one part, by weight, of the magnesium oxide powder to one thousand parts, by weight, of the silica. The plastic mold material, when thus produced, takes an initial set in about half an hour or less.

Where a liquid alkaline material is used as the accelerating agent, for example, ammonium hydroxide, I prefer to mix it with the liquid binder prior to the association of the latter with the dry silica; and in such an event about one part, by weight, of the liquid accelerating agent is added to about one thousand parts, by weight, of the binder.

While I cannot fully explain the action of the accelerating agent, I have found that a variety of inorganic salts and alkaline materials can be used, for example, magnesium hydroxide, calcium oxide or hydroxide, sodium or potassium hydroxide. Where the accelerating agent is a liquid, it is preferably mixed with the binder; and where it is a solid, it is preferably mixed with the silica.

It will be understood that the accelerator causes the composition to set with considerable rapidity (approximately one-half hour at the most) into a condition in which the mold that is formed may be conveniently handled, but that the setting continues thereafter with the passage of time. Further setting and hardening of the mold takes place when the mold is later heated, just prior to the casting operation. This final heat treatment serves to dry out the mold and to expand it for the purpose of compensating for any shrinkage of the material being cast. Usually, this heat treatment consists in raising the temperature of the mold to approximately 1500° F.

Wherever the term "setting" is used herein and in the appended claims, or wherever the claims refer to the characteristic of the present material to "set", it will be understood that the initial setting is primarily referred to, inasmuch as the subsequent continuation of the setting procedure is a matter which takes care of itself and is not of primary importance in connection with the general objectives and advantages of the present invention.

The present mold material, when composed of silica and the present binder, consists, when set, entirely of pure silica, in the form of a mixture of the dry silica ingredient, and silica gel produced by the spontaneous transformation of the conditioned binder. A mold thus composed of pure silica has, to my knowledge, never been produced or used in the art of dental mechanics, and constitutes a valuable and highly desirable accomplishment for the reasons hereinbefore given and for the further specific reasons hereinafter illustratively referred to.

One of the advantages of the present type of mold consists in its ability to expand sufficiently under heat to compensate for the shrinkage of castings. This characteristic is directly due to the desirable thermal expansibility of silica.

Another obvious advantage of the present mold lies in its refractoriness. No special precautions need be taken to prevent overheating, since there is no possibility of inducing any fluxing action, nor of causing any sort of chemical reaction which would impair its refractory character. Accordingly, the present type of mold may be advantageously and successfully used in all cases where it is to come into contact with modern materials of high fusibility, or into proximity with any extremely high temperatures.

The primary advantage of the present mold material lies in the fact that the foregoing desirable qualities and characteristics are coupled with an ability to manipulate and use the mold material, in plastic form, in exactly the same way as ordinary plastic compositions, such as plaster-silica, have customarily been used.

The particular uses to which my present material may be put will be largely obvious to those skilled in the art. It is, of course, admirably suitable for making the ordinary type of mold or investment, which conforms to the accurate and unique contours and configurations of models supplied by the dentist, for the purpose of casting, in the mold cavity, a denture or appliance which is adapted ultimately to conform accurately to the original model.

The present material is also useful in the making of secondary models, which are exact duplicates of the original ordinary plaster models produced by the dentist from impressions taken directly from the patient's mouth. Such secondary models are frequently used for demonstration purposes, or for display, and often they are retained by the dentist or the laboratory for the purpose of comparing an original contour or configuration with a modified contour of a patient's mouth that may develop with the course of time, or by certain treatments. The present material is one which is extremely white and quite dense, when set, and this characteristic makes it highly attractive and useful for this purpose.

Its high refractoriness renders the present material useful, also, for ordinary soldering or welding purposes. For example, where two elements of a denture are to be soldered together, it is often necessary to hold the two parts in proper relationship during the soldering procedure. If the parts are of high fusing material, or if the soldering procedure involves the use of high temperatures, ordinary mold material presents difficulties, while the present material may be safely and satisfactorily used for this purpose.

It frequently happens that certain soldering procedures are best carried out upon a denture that is already cast but which is not completely finished. With the present mold material, the partially completed denture or similar appliance or device may be safely mounted upon the model, and the necessary soldering procedures may be carried out directly upon the appliance while it is so situated. There is no danger of any extreme temperatures damaging or impairing the model upon which the article is mounted or generating undesirable gases while the work is being done; and the fact that the present material has a markedly low thermal conductivity facilitates the work.

One of the most useful purposes to which the present material may be put lies in permitting high fusing metals to be cast in accordance with well-recognized procedures which have heretofore been feasible only with the relatively low fusing metals such as gold. A popular procedure, for example, lies in making a duplicate of the dentist's original model, building a wax pattern on the model, attaching wax sprues to the pattern, and then reinvesting the entire assembly, for example, by setting the assembly into a suitable ring and pouring additional mold material around it. In this procedure, the duplicate model upon which the wax pattern is first formed constitutes an integral part of the finished mold in which the metal is cast. It is obvious that this procedure cannot be carried out in the casting of high fusing metals unless the duplicate model is of sufficiently refractory material. Accordingly, this general procedure, which has a number of advantageous features, has never been feasibly employed for casting high fusing materials; but my present mold material makes it possible to employ this process inasmuch as the duplicate model may be poured and formed, just as before, but with an inherent refractoriness not heretofore attainable.

This same process may also be used without necessarily making a duplicate model of the present material if the wax pattern and its associated sprues are coated, for example, by spraying, with the present plastic material, before the reinvestment procedure.

Frequently, especially in the making of partial dentures, a mold is produced by using a flexible gelatinous impression compound, which is poured in heated and liquid condition onto the dentist's original model, permitted to set, and then removed and used as a reverse model onto which a mold material is poured. My present material is particularly advantageous in carrying out this type of procedure, inasmuch as the usual flexible impression compound is a hydrated material; and when the present material is poured into contact therewith, it readily reacts favorably with the water emanating from the flexible impression. This reaction causes further hydrolysis of the present material, thereby inducing a quicker formation of colloidal silicic acid and precipitation of silica gel immediately adjacent to the flexible impression. This rapid formation of colloidal silicic acid, in the form of a layer, immediately adjacent to the operative face of the impression, results in forming a mold of highly desirable density and firmness, especially along the configured operative face thereof.

The use of the present material for dental molds and models is accompanied by the further advantage that by merely painting the surface of any finished model or mold with additional liquid binder, and wiping off excess liquid, an extremely hard and dense outer layer may be caused to generate. Often, it is feasible to immerse an entire model or mold into a bath of the binder and to permit it to soak up as much of the binder as it will. Upon drying, the model or mold has a smoother and denser surface and is of increased firmness and density throughout. This method of treating a dental mold or model, to increase the firmness and smoothness of its surface, is unique in the art, so far as I am aware, and is of such simplicity and effectiveness as to be of definite utility and value under a variety of circumstances.

In general, it will be understood that the uses to which my present material may be put are by no means restricted to the illustrative examples herein contained, and that the desirable characteristics, qualities, and capabilities of the material, both in its plastic and set conditions, will readily suggest to those skilled in the art the manifold ways in which it may be advantageously utilized.

Furthermore, it will be obvious that changes in the details herein described and illustrated for the purpose of explaining the nature of my invention may be made by those skilled in the art without departing from the spirit and scope of the invention as expressed in the appended claims. It is, therefore, intended that these details be interpreted as illustrative, and not in a limiting sense.

Having thus described my invention, what I claim as new and desire to secure by Letters Patent is—

1. The method of making a settable, highly refractory paste for dental molds, which consists in treating an organic silicate to initiate spontaneously increasing aggregation of colloidal silica particles, and admixing the resultant material, as a binder, with a highly refractory material of the class which includes silica, alumina, and similar oxides.

2. The method of making a settable, highly refractory paste for dental molds, which consists in treating an organic silicate to initiate spontaneously increasing aggregation of colloidal silica particles, admixing the resultant material, as a binder, with a highly refractory material of the class which includes silica, alumina, and similar oxides, and adding an accelerating agent to said mixture to speed the setting thereof.

3. The method of making a settable, highly refractory paste for dental molds, which consists in treating an organic silicate to initiate spontaneously increasing aggregation of colloidal silica particles, admixing the resultant material, as a binder, with a highly refractory material of the class which includes silica, alumina, and similar oxides, and adding magnesium oxide to said mixture as an accelerating agent to speed the setting thereof.

4. The method of making a settable, highly refractory paste for dental molds, which consists in treating an organic silicate to initiate spontaneously increasing aggregation of colloidal silica particles, admixing the resultant material, as a binder, with a highly refractory material of the class which includes silica, alumina, and similar oxides, and heating said mixture to speed the setting thereof.

5. The method of making a settable, highly refractory paste for dental molds, which consists in treating an organic silicate of the class which includes tetra-ethyl silicate, tetra-butyl silicate, methyl silicate, and di-glycol silicate, to initiate spontaneously increasing aggregation of colloidal silica particles, and admixing the resultant material, as a binder, with a highly refractory material of the class which includes silica, alumina, and similar oxides.

6. The method of making a settable, highly refractory paste for dental molds, which consists in acidifying an organic silicate to initiate spontaneously increasing aggregation of colloidal silica particles, and admixing the resultant material, as a binder, with a highly refractory material of the class which includes silica, alumina, and similar oxides.

7. The method of making a settable, highly refractory paste for dental molds, which consists in adding water and a trace of an acidifying agent to an organic silicate to initiate hydrolysis of the latter and to initiate a spontaneously increasing aggregation of colloidal silica particles, admixing the resultant material, as a binder, with a highly refractory material of the class which includes silica, alumina, and similar oxides, and incorporating with said mixture a trace of an accelerating agent to speed the setting action.

8. A highly refractory dental mold composed solely of a main refractory material and a binder of silica gel.

9. A highly refractory dental mold consisting solely of a refractory material of the class which includes silica, alumina, and similar oxides, admixed with a binder of silica gel.

10. A settable, highly refractory paste for dental molds, composed of a main refractory ingredient, and a liquid binder adapted spontaneously and increasingly to generate pure silica gel.

11. A settable, highly refractory paste for dental molds, composed mainly of a refractory ingredient of the class which includes silica, alumina, and similar oxides, and a binder consisting of a hydrolyzed, acidified, organic silicate adapted spontaneously and increasingly to generate silica gel.

12. A settable plastic material for dental molds composed of dry silica admixed with a binder and an accelerating agent for speeding the setting action, the binder consisting of a hydrolyzed, acidified organic silicate adapted spontaneously to form an increasing aggregation of colloidal silica particles.

13. The method of treating a dental mold or model to increase the firmness and smoothness of its surface, which consists in impregnating the mold or model with an organic silicate adapted spontaneously and increasingly to generate silica gel, and then drying it.

In witness whereof I have signed this specification this 5 day of October 1932.

CHARLES H. PRANGE.